United States Patent
Balsiger et al.

(10) Patent No.: US 11,713,108 B2
(45) Date of Patent: Aug. 1, 2023

(54) HINGE-LINE ACTUATOR FOR ROTATING AN AIRCRAFT CONTROL SURFACE

(71) Applicant: Hamilton Sundstrand Corporation, Charlotte, NC (US)

(72) Inventors: Derick S. Balsiger, Prescott Valley, AZ (US); Keith Bloxham, Gilbert, AZ (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 1 day.

(21) Appl. No.: 17/494,217

(22) Filed: Oct. 5, 2021

(65) Prior Publication Data
US 2023/0105006 A1   Apr. 6, 2023

(51) Int. Cl.
| | | |
|---|---|---|
| *B64C 13/34* | (2006.01) | |
| *B64C 13/50* | (2006.01) | |
| *F16H 19/08* | (2006.01) | |
| *B64C 9/00* | (2006.01) | |

(52) U.S. Cl.
CPC .............. *B64C 13/34* (2013.01); *B64C 9/00* (2013.01); *B64C 13/50* (2013.01); *F16H 19/08* (2013.01); *B64C 2009/005* (2013.01)

(58) Field of Classification Search
CPC ........... B64C 13/34; B64C 9/00; B64C 13/50; B64C 2009/005; F16H 19/08
See application file for complete search history.

(56) References Cited

U.S. PATENT DOCUMENTS

| | | | |
|---|---|---|---|
| 2,932,473 A | 4/1960 | Kass et al. | |
| 4,979,700 A * | 12/1990 | Tiedeman | B64C 13/34 244/99.2 |
| 9,643,716 B2 * | 5/2017 | Sheahan, Jr. | B64C 9/02 |
| 10,759,515 B2 | 9/2020 | Van De Veire et al. | |
| 2013/0305855 A1 * | 11/2013 | Skogward | F16H 19/08 74/89.14 |
| 2015/0354686 A1 | 12/2015 | Balsiger | |
| 2018/0000672 A1 * | 1/2018 | Heneveld, Jr. | F16H 19/08 |
| 2018/0015999 A1 * | 1/2018 | Van De Veire | B64C 9/02 |
| 2018/0112760 A1 * | 4/2018 | Balsiger | B64C 13/34 |
| 2019/0011032 A1 | 1/2019 | Balsiger et al. | |
| 2020/0332872 A1 | 10/2020 | Balsiger et al. | |
| 2022/0090663 A1 * | 3/2022 | Larson | F16H 35/00 |

OTHER PUBLICATIONS

Extended European Search Report for EP Application No. 22199604.4, dated Feb. 20, 2023, pp. 1-10.

* cited by examiner

*Primary Examiner* — Rodney A Bonnette
(74) *Attorney, Agent, or Firm* — Cantor Colburn LLP

(57) ABSTRACT

A hinge-line actuator has: a drive shaft; first and second ground gears spaced apart along the drive shaft, wherein the first and second output gears include first and second contoured outer gear surfaces; and an output gear disposed on the drive shaft and disposed between the first and second ground gears, wherein the output gear includes a third contoured outer gear surface; an actuator housing that includes: contoured first, second and third gear seats that, respectively, seat the first, second and third outer gear surfaces.

15 Claims, 5 Drawing Sheets

FIG. 7,8

HINGE-LINE ACTUATOR FOR ROTATING AN AIRCRAFT CONTROL SURFACE

BACKGROUND

Exemplary embodiments pertain to the art of geared actuator systems and, more specifically, to a hinge-line actuator for rotating an aircraft control surface.

Hinge-line actuators utilize compound differential gearing to provide high-torque, low-speed power transmission of power. The actuators may be utilized for controlling a control surface of an aircraft such as a flap that is rotatably coupled to a wing spar. A benefit of such actuators is that they may be compact and lightweight.

BRIEF DESCRIPTION

Disclosed is a hinge-line actuator including: a drive shaft; first and second ground gears spaced apart along the drive shaft, wherein the first and second output gears include first and second contoured outer gear surfaces; and an output gear disposed on the drive shaft and disposed between the first and second ground gears, wherein the output gear includes a third contoured outer gear surface; an actuator housing that includes: contoured first, second and third gear seats that, respectively, seat the first, second and third outer gear surfaces.

In addition to one or more of the above disclosed aspects of the actuator, or as an alternate the first and second gear seats are rotatably coupled to a first structure and the third gear seat is fixed to the first structure; and the actuator housing includes: first and second gear seat extensions that, respectively, extend from the first and second gear seats to a second structure.

In addition to one or more of the above disclosed aspects of the actuator, or as an alternate the first, second and third outer gear surfaces are each shaped as polygons.

In addition to one or more of the above disclosed aspects of the actuator, or as an alternate the actuator includes first and second wheel flanges that are, respectively, disposed against exterior facing surfaces of the first and second ground gears; and first and second stub shafts that, respectively, extend outwardly from the first and second wheel flanges and surround the drive shaft, and wherein the actuator housing has first and second centering brackets that are, respectively, disposed adjacent to the first and second gear seats, the first centering bracket incudes a first axial arm that is disposed radially between, and axially aligned with, the first gear seat and the first sub shaft, the second centering bracket incudes a second axial arm that is disposed radially between, and axially aligned with the second gear seat and the second sub shaft, and wherein a first bearing that is disposed between the first axial arm of the first centering bracket and the first stub shaft, and a second bearing is disposed between the second axial arm of the second centering bracket and the second stub shaft.

In addition to one or more of the above disclosed aspects of the actuator, or as an alternate the actuator includes a third bearing disposed between the first axial arm of the first centering bracket and the first gear seat; and a fourth bearing disposed between the second axial arm of the second centering bracket and the second gear seat.

In addition to one or more of the above disclosed aspects of the actuator, or as an alternate the first and second ground gears have a same gear configuration as each other; and the first ground gear and the output gear have mutually differing gear configurations.

In addition to one or more of the above disclosed aspects of the actuator, or as an alternate the drive shaft is configured to be driven by a motor that is spaced apart from the actuator housing.

In addition to one or more of the above disclosed aspects of the actuator, or as an alternate the actuator housing is formed from a composite.

Further disclosed is an aircraft including: a movable structure; a stationary structure; a hinge-line actuator that rotatably couples the stationary structure to the movable structure, the hinge-line actuator including: a drive shaft; first and second ground gears spaced apart along the drive shaft, wherein the first and second output gears include first and second contoured outer gear surfaces; and an output gear disposed on the drive shaft and disposed between the first and second ground gears, wherein the output gear includes a third contoured outer gear surface; an actuator housing in the movable structure that includes: contoured first, second and third gear seats that, respectively, seat the first, second and third outer gear surfaces.

In addition to one or more of the above disclosed aspects of the aircraft, or as an alternate the first and second gear seats are rotatably coupled to the movable structure and the third gear seat is fixed to the movable structure; and the actuator housing includes: first and second gear seat extensions that, respectively, extend from the first and second gear seats to the stationary structure.

In addition to one or more of the above disclosed aspects of the aircraft, or as an alternate the first, second and third outer gear surfaces are each shaped as polygons.

In addition to one or more of the above disclosed aspects of the aircraft, or as an alternate the first and second ground gears, respectively, have first and second axial outer gear surfaces that face opposite directions along the drive shaft; and the actuator further includes: first and second wheel flanges that are, respectively, disposed against the first and second axial outer gear surfaces; and first and second stub shafts that, respectively, extend outwardly from the first and second wheel flanges and surround the drive shaft, wherein the actuator housing has first and second centering brackets that are integrally connected to the movable structure and are, respectively, disposed adjacent to the first and second gear seats, the first centering bracket incudes a first axial arm that is disposed radially between, and axially aligned with, the first gear seat and the first sub shaft, the second centering bracket incudes a second axial arm that is disposed radially between, and axially aligned with the second gear seat and the second sub shaft, and wherein a first bearing is disposed between the first arm of the first centering bracket and the first stub shaft, and a second bearing is disposed between the second arm of the second centering bracket and the second stub shaft.

In addition to one or more of the above disclosed aspects of the aircraft, or as an alternate the aircraft includes a third bearing disposed between the first arm of the first centering bracket and the first gear seat; and a fourth bearing disposed between the second arm of the second centering bracket and the second gear seat.

In addition to one or more of the above disclosed aspects of the aircraft, or as an alternate the first and second ground gears have a same gear configuration as each other; and the first ground gear and the output gear have mutually differing gear configurations.

In addition to one or more of the above disclosed aspects of the aircraft, or as an alternate the drive shaft is driven by a motor that is spaced apart from the movable structure.

In addition to one or more of the above disclosed aspects of the aircraft, or as an alternate the actuator housing is formed from a composite.

In addition to one or more of the above disclosed aspects of the aircraft, or as an alternate the motor is located in a fuselage or a wing.

In addition to one or more of the above disclosed aspects of the aircraft, or as an alternate the stationary structure extends between forward and aft ends of the stationary structure; the stationary structure aft end includes a stationary structure aft support that extends between inner and outer ends of the stationary structure, and the first and second gear seat extensions, respectively, extend from the first and second gear seats to the stationary structure aft support; and the movable structure extends between the movable structure forward and aft ends, and the actuator housing is located at the movable structure forward end.

In addition to one or more of the above disclosed aspects of the aircraft, or as an alternate the stationary structure is a wing; the stationary structure forward end define a leading edge of a wing; the stationary structure aft support is an aft spar; the movable structure is a flap or aileron; and the movable structure aft end defines a trailing edge of the wing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
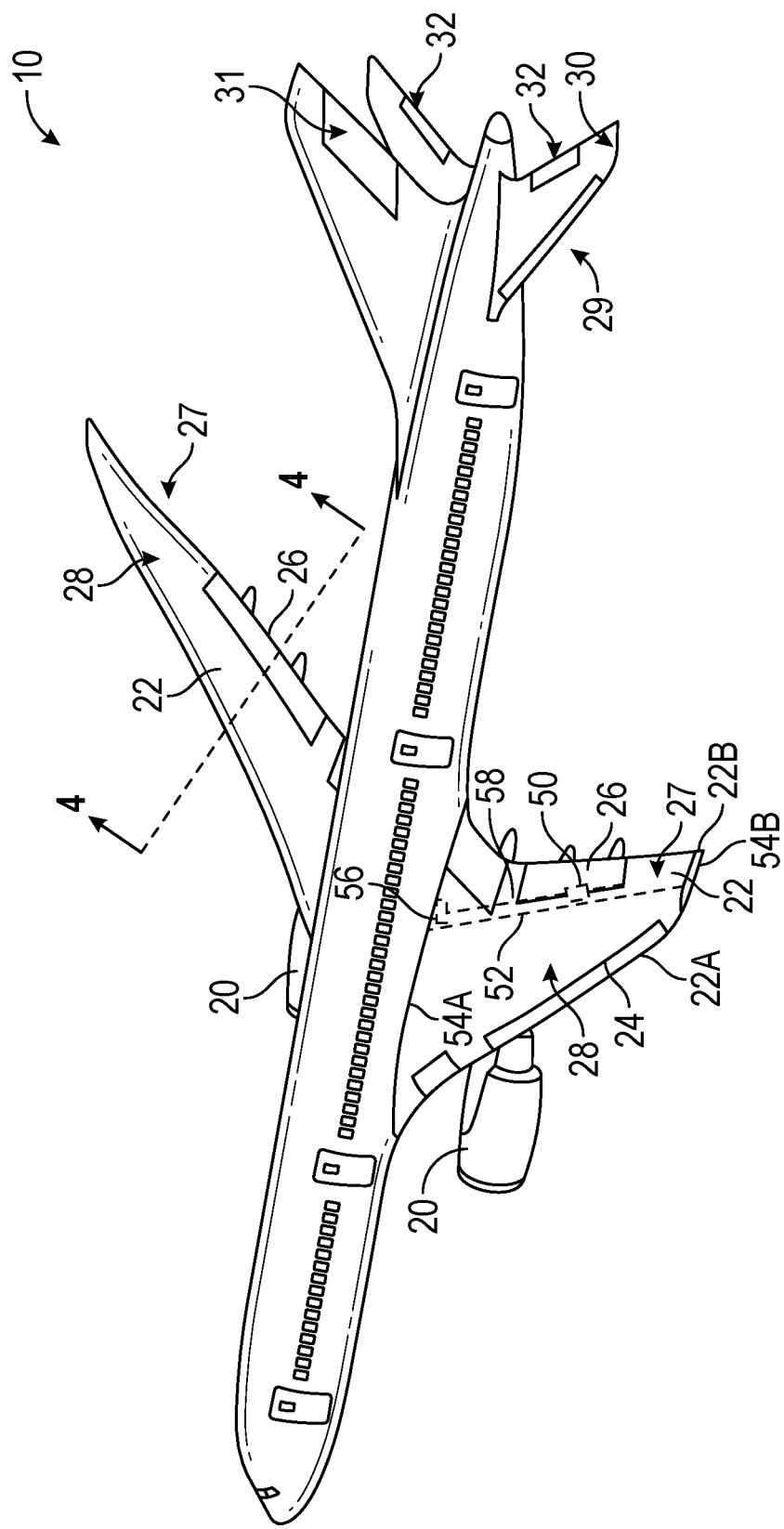
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) nacelles 20. The aircraft 10 includes two wings 22 that each extend from a leading edge 22A to a trailing edge 22B and can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" 40 as they are movable under aircraft power systems. A hinge-line actuator 50 may be connected to the wing aft spar 52, e.g., that extends spanwise across the wing 22, e.g., between inner and outer ends 54A, 54B of the wing 22. The actuator 50 may be connected to the control surface of the aircraft, such as a flap 26 or aileron 27, for rotatably coupling the control surface to the wing 22.

Figure 2:
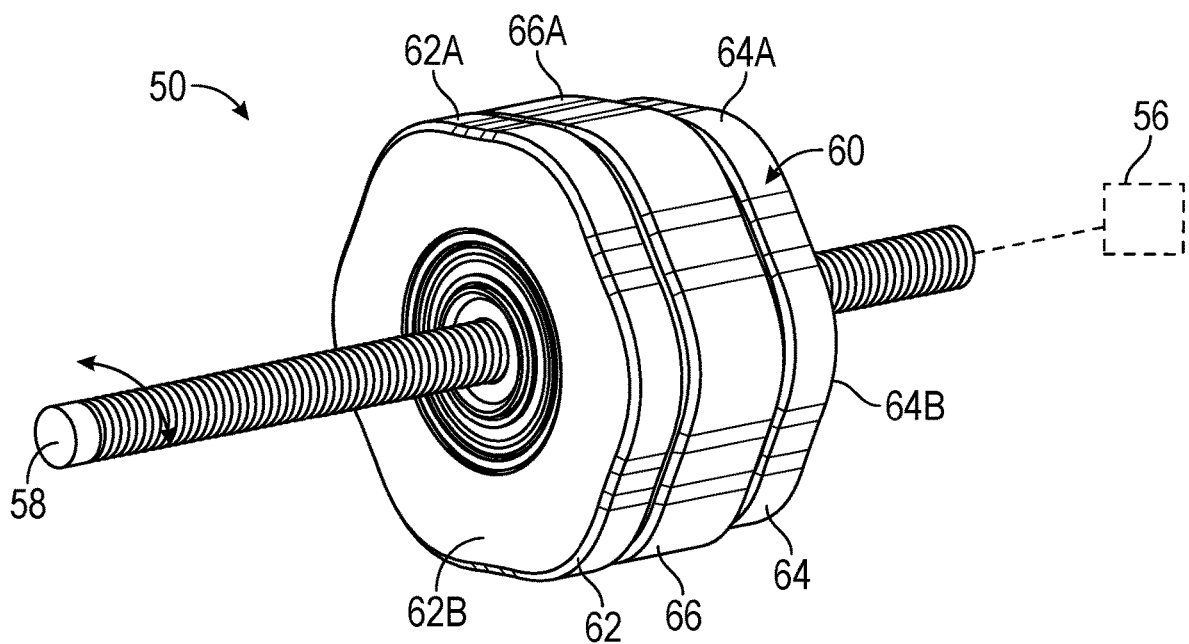
FIG. 2 shows a gearset utilized for the hinge-line actuator.

The wing 22 can be formed of a composite and may be thinly designed so that an area utilized to place the actuator 50 may be limited. To accommodate such spatial limitations, FIG. 2 shows aspects of the actuator 50 according to an embodiment. The actuator includes a drive shaft 58 and, as indicated, the actuator 50 may be driven by the motor 56 via the drive shaft 58. More specifically, the actuator 50 includes a gearset 60 that is driven to rotate by the drive shaft 58. The gearset 60 includes first and second ground gears 62, 64 that are spaced apart along the drive shaft 58. An output gear 66 is disposed on the drive shaft 58, between the first and second ground gears 62, 64. The first and second ground gears 62, 64 and the output gear 66, respectively, include first, second and third contoured outer gear surfaces 62A, 64A, 66A. The outer gear surfaces 62A, 64A, 66A may be shaped as polygons with rounded edges. In one non-limiting embodiment, the outer gear surfaces 62A, 64A, 66A form lobes and in one non-limiting embodiment the lobes are grooveless. The first and second ground gears 62, 64, respectively, include first and second axially outer facing surfaces 62B, 64B that face opposite directions along the drive shaft 58.

Figure 3:
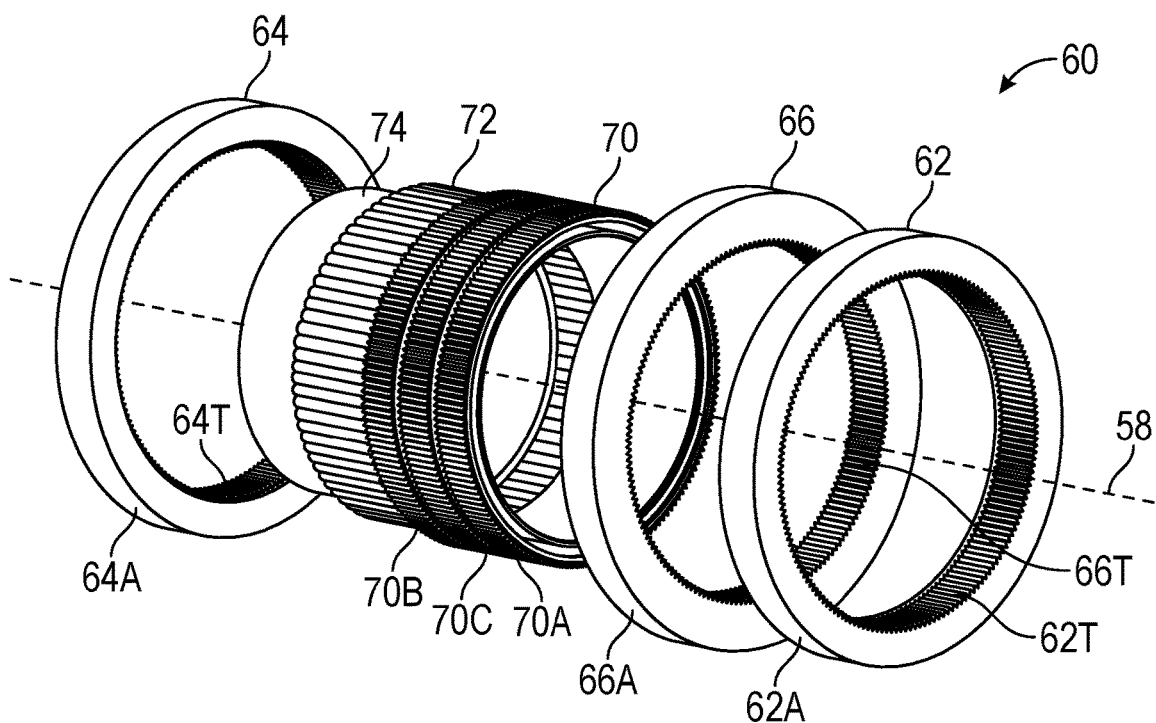
FIG. 3 is an exploded view of a gearset.

Turning to FIG. 3, a schematic illustration of an exploded view of the gearset 60 is shown. The gearset 60 may be a compound harmonic reduction gearset (or compound harmonic drive) that includes the first and second ground gear 62, 64 with the output gear 66 between the first and second ground gear 62, 64. The outer gear surfaces 62A, 64A, 66A are shown as round instead of contoured for simplicity. The gearset includes a flex spline 70 that is surrounded by the gears 62, 64, 66. Wave generator bearings 72 are surrounded by the flex spline 70, and a wave generator 74 is surrounded by the wave generator bearings 72. The drive shaft 58 drives the wave generator 74. The first ground gear 62 has first inner facing teeth 62T that face a first outer facing spline 70A of the flex spline 70. The second ground gear 64 has second inner facing teeth 64T that face a second outer facing spline 70B of the flex spline 70. The output gear 66 has third inner facing teeth 66T that face a third outer facing spline 70C of the flex spline 70.

The splines 70A-70C are configured to mesh with the ground gears 62, 64 and the output gear 66 according to the different gear ratios. The first spline 70A and the first ground gear 62 have a gear ratio (Ratio 1, below). The second spline 70B and the second ground gear 64 have a gear ratio that is the same as the first gear ratio. The third spline 70C and the output gear 66 have another gear ratio (Ratio 2, below) that differs from the first gear ratio. Being that the splines 70A-70C are integral to the same structure, i.e., the flex spline 70, the different gear ratios together form a compound gear ratio (Compound Ratio, below). The compound gear ratio provides a differential motion between the ground gears 62, 64 and the output gear 66.

The compound gear ratio is represented as the difference of the individual gear ratios, shown below. The ratios are identified relative to the output gear 66 and one of the ground gears (e.g., the first ground gear 62) being that the ground gears are configured the same as each other.

$$\text{Ratio 1} = \frac{\text{Teeth in Third (Output) Spline (70c)}}{\text{Teeth in Third Spline (70c) - Teeth in Outpt Gear (66T)}} (70c)$$

$$\text{Ratio 2} = \frac{\text{Teeth in First (Ground) Spline (70a)}}{\text{Teeth in First Spline (70a) - Teeth in First Ground Gear (62T)}}$$

$$\text{Compound Ratio} = \frac{1}{\frac{1}{\text{Ratio 1}} - \frac{1}{\text{Ratio 2}}}$$

It is to be appreciated that other reduction gearsets are within the scope of the embodiments. For example, an epicyclical gearset, as one example, may be utilized in place of the compound harmonic gearset.

Figure 4:
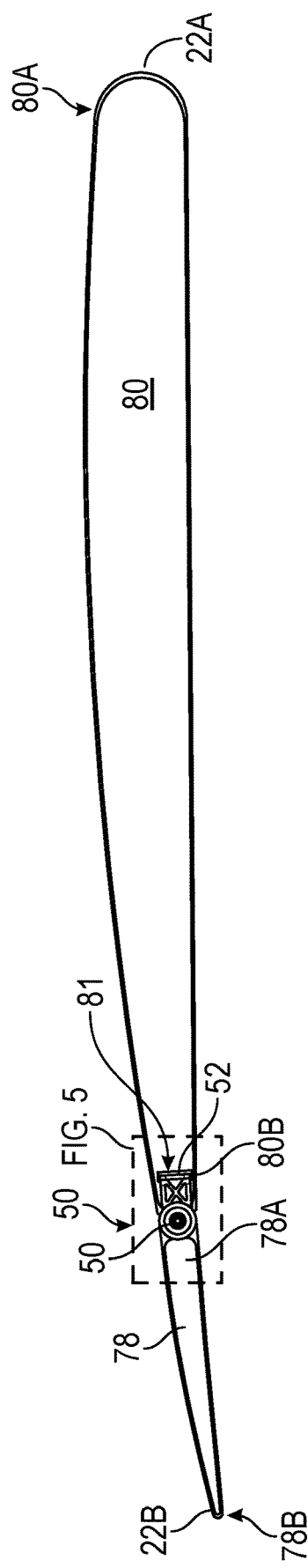
FIG. 4 is a cross-sectional view of a wing taken along line 4-4 in FIG. 1, showing a hinge-line actuator and a flap.
Figure 5:
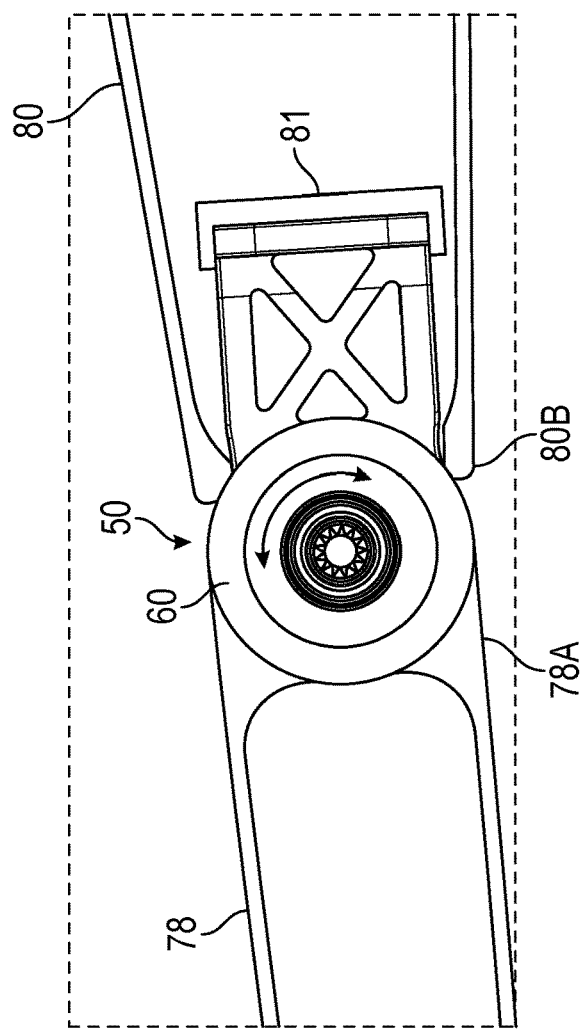
FIG. 5 shows additional aspects of the cross-sectional view of FIG. 4.

FIGS. 4 and 5 shows the gearset 60 in the actuator 50, utilized to control the movable structure 78 (or first structure), which is a flap 26 or slat 24, against a stationary structure 80 (or second structure), which is a wing 22. Generally, the stationary structure 80 extends between a stationary structure forward end 80A (e.g., at the leading edge 22A (FIG. 4)) and an aft end 80B that has a stationary structure aft support 81 (the aft spar 52). The movable structure 78 extends between the movable structure forward end 78A (near the aft spar 52), and a movable structure aft end 78B(e.g., at the trailing edge 22B (FIG. 4)).

Figure 6:
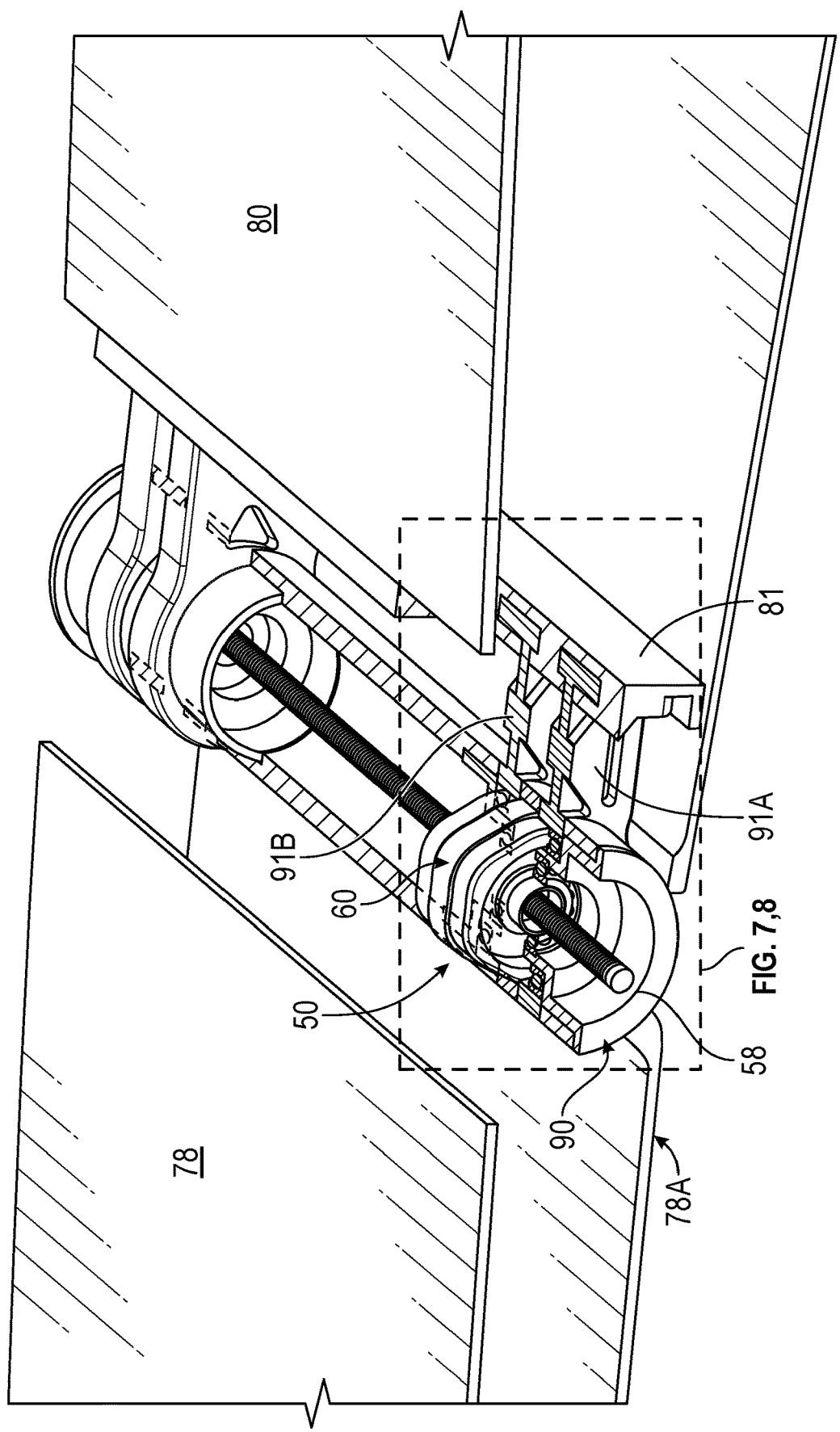
FIG. 6 is a partial exploded view of the hinge-line actuator of FIG. 4, the wing and the flap.

Turning to FIG. 6, an actuator housing 90 for the actuator 50 that seats the gearset 60 is located in the movable structure 78. More specifically, the housing 90 may be located at the movable structure forward end 78A. The housing 90 may be formed of a composite. The housing 90 includes first and second gear seat extensions 91A, 91B that are rotatably coupled to the housing 90 and extend to the aft support 81 of the stationary structure 80. With this configuration, in operation, rotation of the drive shaft 58 rotates the movable structure 78 about the drive shaft 58.

Figure 7:
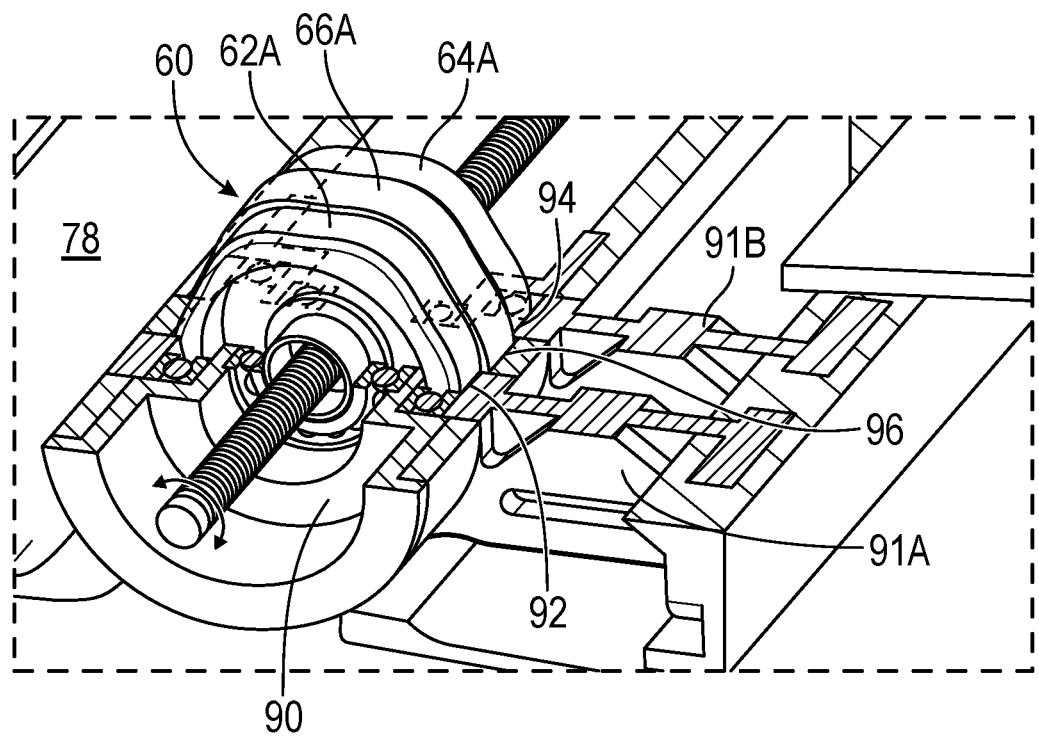
FIG. 7 shows additional aspects of the partial exploded view of FIG. 6, directed to a configuration of gear seating surfaces that provide for relative motion between structures.

Turning to FIG. 7, the housing 90 includes contoured first, second and third gear seats 92, 94, 96 that are, respectively, sized and shaped to seat the first, second and third outer gear surfaces 62A, 64A, 66A. The first and second gear seats 92, 94 are rotatably coupled to the movable structure 78 and are, respectively, integral with the first and second gear seat extensions 91A, 91B. The third gear seat 96 is fixed to the movable structure 78 and rotatable relative to the first and second gear seat extensions 91A, 91B. The relative rotational configuration of the gear seats 92, 94, 96 enables rotation of the movable structure 78 against the stationary structure 80. Being that the housing 90 may be made of a composite, splines or other gear configurations may result in material fail when the gearset 60 is engaged. Utilizing contoured (e.g., lobed) shapes mitigates this issue.

Figure 8:
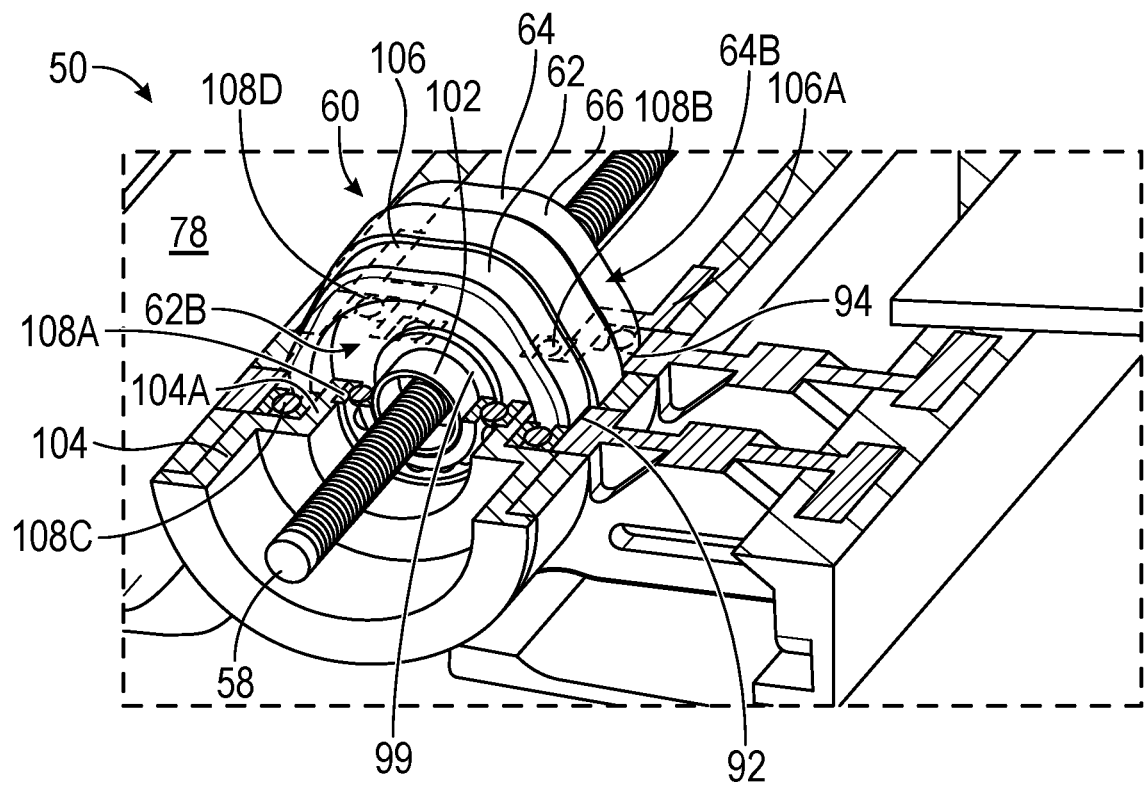
FIG. 8 shows additional aspects of the partial exploded view of FIG. 6, directed to gear centering brackets.

Turning to FIG. 8, a first wheel flange 99 is disposed against the first axially outer gear surface 62B of the first ground gear 62 such that, in operation, the first wheel flange 99 rotates with the first ground gear 62. A first stub shaft 102 extends outwardly from the first wheel flange 99 and surrounds a portion of the drive shaft 58. A second stub shaft (not shown) is disposed against the second axially outer gear surfaces 64B of the second ground gear 64 and has a same configuration as the first stub shaft 102, so that it rotates with the second ground gear 64 and includes a second outwardly extending stub shaft that surrounds a portion of the drive shaft 58.

The actuator housing 90 has first and second centering brackets 104, 106 that are integrally connected to the movable structure 78. The first and second centering brackets 104, 106 are, respectively, disposed adjacent to the first and second gear seats 92, 94. The first centering bracket 104 incudes a first axial arm 104A that is disposed radially between, and axially aligned with, the first gear seat 92 and the first sub shaft 102. The second centering bracket 106 incudes a second axial arm 106A that is disposed radially between, and axially aligned with, the second gear seat 94 and the second sub shaft (not shown). A first bearing 108A is disposed between a first axial arm 104A of the first centering bracket 104 and the first stub shaft 102, to provide rolling engagement therebetween. Similarity, a second bearing 108B is disposed between a second axial arm 106A of the second centering bracket 106 and the second stub shaft. A third bearing 108C is disposed between the first axial arm 104A of the first centering bracket 104 and the first gear seat 92, adjacent to the first ground gear 62, to provide rolling engagement therebetween. Similarly, a fourth bearing 108D is disposed between the second axial arm 106A of the second centering bracket 106 and the second gear seat 94, adjacent to the second ground gear 64. That is, the gear seats 92, 94 are each axially long enough to receive a respective one of the third and fourth bearings 108C, 108D and a respective one of the ground gear 62, 64.

The combination of bearings 108A-108D on either axial side of bracket arms 104A, 106A and against the first stub shaft 102 and second stub shaft (not shown) enable relative rotation between the brackets 104, 106, the ground gear 62, 64 and their seats 92, 94. Thus the brackets 104, 106 may remain rotationally fixed with the movable structure 78 along with the output gear 66. In addition, this configuration provides for radial centering of the first stub shaft 102 and second stub shaft, and therefore the gearset 60 during operation of the actuator 50.

According, the above disclosure provides a hinge-line actuator suitable for placement at the hinge line of a control surface of a thinly structured composite wing. A configuration of a gearset of the hinge-line actuator enables transferring torque without damaging the engaged composite structure. An actuator housing is built into the control surface to maximize a utilization of an available cross-sectional area.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:
1. A hinge-line actuator comprising:
   a drive shaft;
   first and second ground gears spaced apart along the drive shaft, wherein the first and second ground gears include first and second contoured outer gear surfaces; and
   an output gear disposed on the drive shaft and disposed between the first and second ground gears, wherein the output gear includes a third contoured outer gear surface;

an actuator housing that includes:
contoured first, second and third gear seats that, respectively, seat the first, second and third outer gear surfaces,
wherein:
the first and second gear seats are rotatably coupled to a first structure and the third gear seat is fixed to the first structure; and
the actuator housing includes:
first and second gear seat extensions that, respectively, extend from the first and second gear seats to a second structure; and
the actuator further comprises:
first and second wheel flanges that are, respectively, disposed against exterior facing surfaces of the first and second ground gears; and
first and second stub shafts that, respectively, extend outwardly from the first and second wheel flanges and surround the drive shaft, and
wherein the actuator housing has first and second centering brackets that are, respectively, disposed adjacent to the first and second gear seats,
the first centering bracket incudes a first axial arm that is disposed radially between, and axially aligned with, the first gear seat and the first sub shaft,
the second centering bracket incudes a second axial arm that is disposed radially between, and axially aligned with the second gear seat and the second sub shaft, and
wherein a first bearing that is disposed between the first axial arm of the first centering bracket and the first stub shaft, and a second bearing is disposed between the second axial arm of the second centering bracket and the second stub shaft.

2. The actuator of claim 1, wherein:
the first, second and third outer gear surfaces are each shaped as polygons.

3. The actuator of claim 1, further comprising:
a third bearing disposed between the first axial arm of the first centering bracket and the first gear seat; and
a fourth bearing disposed between the second axial arm of the second centering bracket and the second gear seat.

4. The actuator of claim 1, wherein:
the first and second ground gears have a same gear configuration as each other; and
the first ground gear and the output gear have mutually differing gear configurations.

5. The actuator of claim 1, wherein:
the drive shaft is configured to be driven by a motor that is spaced apart from the actuator housing.

6. The actuator of claim 1, wherein:
the actuator housing is formed from a composite.

7. An aircraft comprising:
a movable structure;
a stationary structure;
a hinge-line actuator that rotatably couples the stationary structure to the movable structure, the hinge-line actuator including:
a drive shaft;
first and second ground gears spaced apart along the drive shaft, wherein the first and second ground gears include first and second contoured outer gear surfaces; and
an output gear disposed on the drive shaft and disposed between the first and second ground gears, wherein the output gear includes a third contoured outer gear surface;
an actuator housing in the movable structure that includes:
contoured first, second and third gear seats that, respectively, seat the first, second and third outer gear surfaces,
wherein:
the first and second gear seats are rotatably coupled to the movable structure and the third gear seat is fixed to the movable structure; and
the actuator housing includes:
first and second gear seat extensions that, respectively, extend from the first and second gear seats to the stationary structure; and
wherein:
the first and second ground gears, respectively, have first and second axial outer gear surfaces that face opposite directions along the drive shaft and
the actuator further includes:
first and second wheel flanges that are, respectively, disposed against the first and second axial outer gear surfaces; and
first and second stub shafts that, respectively, extend outwardly from the first and second wheel flanges and surround the drive shaft,
wherein the actuator housing has first and second centering brackets that are integrally connected to the movable structure and are, respectively, disposed adjacent to the first and second gear seats,
the first centering bracket incudes a first axial arm that is disposed radially between, and axially aligned with, the first gear seat and the first sub shaft,
the second centering bracket incudes a second axial arm that is disposed radially between, and axially aligned with the second gear seat and the second sub shaft, and
wherein a first bearing is disposed between the first arm of the first centering bracket and the first stub shaft, and a second bearing is disposed between the second arm of the second centering bracket and the second stub shaft.

8. The aircraft of claim 7, wherein:
the first, second and third outer gear surfaces are each shaped as polygons.

9. The aircraft of claim 7, further comprising:
a third bearing disposed between the first arm of the first centering bracket and the first gear seat; and
a fourth bearing disposed between the second arm of the second centering bracket and the second gear seat.

10. The aircraft of claim 7, wherein:
the first and second ground gears have a same gear configuration as each other; and
the first ground gear and the output gear have mutually differing gear configurations.

11. The aircraft of claim 7, wherein:
the drive shaft is driven by a motor that is spaced apart from the movable structure.

12. The aircraft of claim 11, wherein
the motor is located in a fuselage or a wing.

13. The aircraft of claim 7, wherein:
the actuator housing is formed from a composite.

14. The aircraft of claim 7, wherein:
the stationary structure extends between forward and aft ends of the stationary structure;
the stationary structure aft end includes a stationary structure aft support that extends between inner and outer ends of the stationary structure, and the first and second gear seat extensions, respectively, extend from the first and second gear seats to the stationary structure aft support; and the movable structure extends between the movable structure forward and aft ends, and the actuator housing is located at the movable structure forward end.

15. The aircraft of claim 14, wherein:

the stationary structure is a wing;

the stationary structure forward end define a leading edge of a wing;

the stationary structure aft support is an aft spar;

the movable structure is a flap or aileron; and the movable structure aft end defines a trailing edge of the wing.

* * * * *